United States Patent [19]
Dobrow

[11] Patent Number: 6,121,551
[45] Date of Patent: Sep. 19, 2000

[54] UNI-WIRE VEHICLE WIRING SYSTEM AND METHOD

[75] Inventor: Robert H. Dobrow, Rockwall, Tex.

[73] Assignee: Maxi-Seal Harness Systems, Inc., Garland, Tex.

[21] Appl. No.: 09/127,205

[22] Filed: Jul. 31, 1998

[51] Int. Cl.$^7$ ........................................................ H01B 7/04
[52] U.S. Cl. ........................................................ 174/113 R
[58] Field of Search ............................ 174/113 R, 115, 174/112, 72 A, 72 R, 68.1, 68.2, 68.3, 96

[56] References Cited

U.S. PATENT DOCUMENTS

| | | | |
|---|---|---|---|
| 3,715,458 | 2/1973 | Bayes et al. | ......................... 174/113 R |
| 3,836,415 | 9/1974 | Hilderbrandt . | |
| 3,898,371 | 8/1975 | Bridgett . | |
| 4,065,199 | 12/1977 | Andre et al. . | |
| 4,381,208 | 4/1983 | Baverstock . | |
| 4,430,139 | 2/1984 | Baverstock . | |
| 5,010,642 | 4/1991 | Takahashi et al. . | |
| 5,160,812 | 11/1992 | Takahashi et al. . | |
| 5,486,654 | 1/1996 | Hanak et al. | ......................... 174/113 R |
| 5,504,540 | 4/1996 | Shatas | ......................... 348/844 |

OTHER PUBLICATIONS

Sales Literature of Phillips Industries, Montebello, California (p. 42) for single van harness, exact publication date unknown, No. Date.

*Primary Examiner*—Kristine Kincaid
*Assistant Examiner*—Chau N. Nguyen
*Attorney, Agent, or Firm*—Shughart Thomson & Kilroy P.C.

[57] ABSTRACT

A uni-wire vehicle wiring harness system and method for extending electrical power from a front portion of a vehicle to lighting and accessories proximate the rear of the vehicle, the vehicle includes a uni-wire cable pair which includes a curb side cable with conductors solely supplying power to curb side marker, tail and signal lights and a road side cable solely supplying power to road side marker, tail and signal lights. The curb side and road side cables are attached to each other via a web extending between their respective insulation jackets.

14 Claims, 3 Drawing Sheets

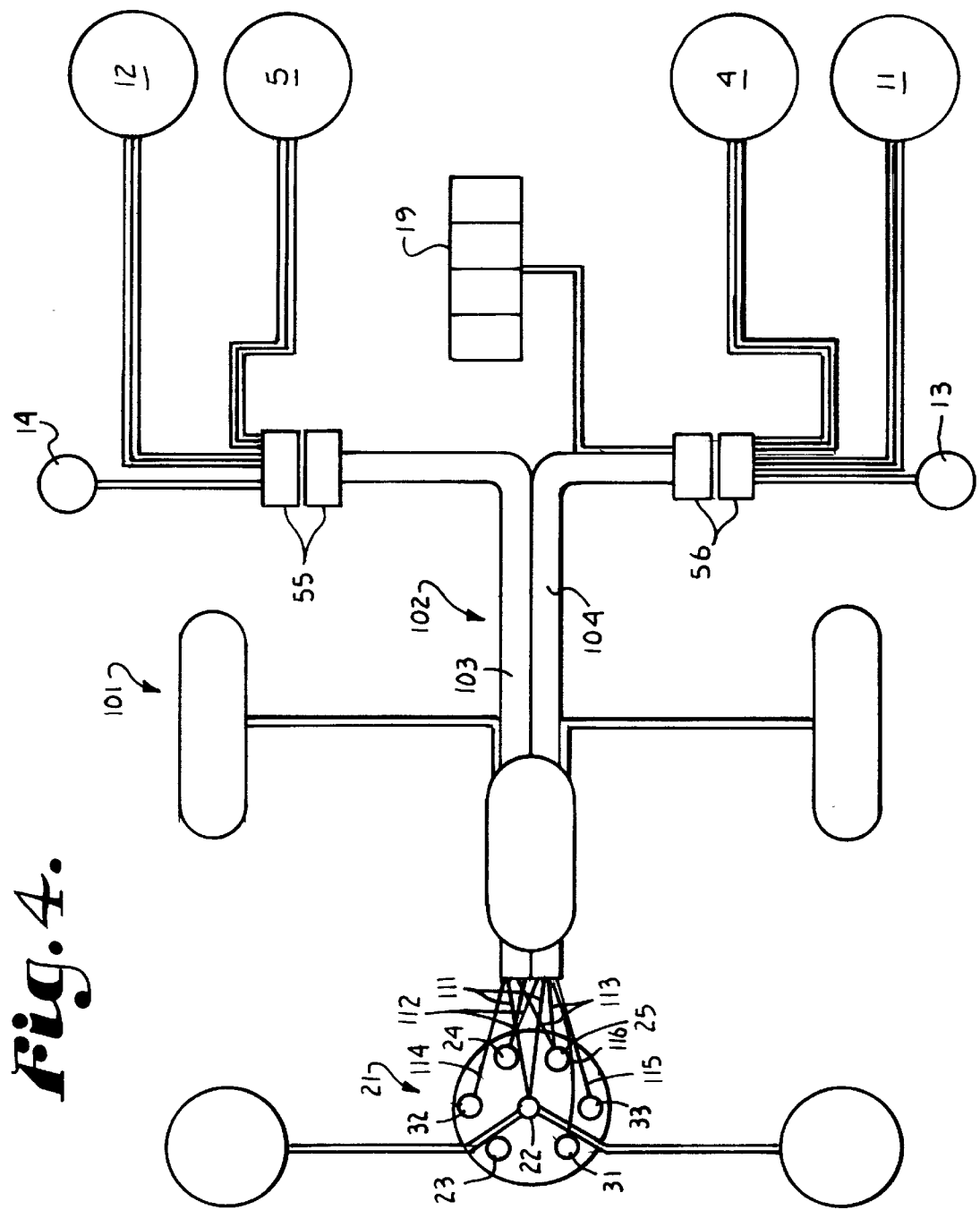

UNI-WIRE VEHICLE WIRING SYSTEM AND METHOD

FIELD OF THE INVENTION

The present invention relates to an improved vehicle wiring harness system and method, and, more particularly, to such a system and method in which a pair of cables are extruded together to form a cable pair with each cable in the pair carrying exclusively left or right lighting conductors for the vehicle.

BACKGROUND OF THE INVENTION

Left and right lighting systems for large panel trucks, semi-trailers and the like have traditionally been supplied with electrical current via a single cable with multiple individual insulated conductors arrayed therein. For example, depending upon vehicle lighting complexity and accessories, six, seven or more individual conductors are contained in the single cable, which extends from a standard "nose box" on the front of the truck or trailer to the lighting and accessory systems on the rear and side of the truck or trailer. Of the conductors in the cable, four or five are dedicated to the lighting systems, with a white wire providing a common ground. Of the four or five lighting wires, brown and black are both common conductors feeding left and right marker and tail lights, red is a common conductor feeding left and right stop lights, green is a dedicated conductor feeding a curbside turn signal, and yellow is a dedicated conductor feeding a roadside turn signal. An additional blue conductor is often included for anti-lock braking systems.

Since four of the wires are common to both left and right lights, a junction plug must be provided at the rear terminus of the multi-conductor cable to split each of the common conductors to left and right conductors. Furthermore, the provision of common wires running the length of the truck or trailer means that heavier gauge conductors must be used to minimize resistance, e.g. 12 gauge wire is required for the common conductors in a typical semi-trailer.

This typical truck or trailer wiring arrangement presents a number of problems. Due to the relatively heavy gauge conductors needed, the multi-conductor cable is fairly rigid and inflexible, thus creating problems as it is bent around obstacles or fed through openings. The heavier gauge conductors are also more expensive. The junction plug which is required for splitting the common conductors between left and right circuits is expensive, adds resistance and is subject to moisture penetration and accompanying corrosion. Additional labor is required for installing, testing and providing moisture protection for the junction plug, which also adds to a manufacturer's cost.

It is clear that a need exists for an improved wiring system and method for vehicles and trailers. Such an improved system should allow the use of smaller gauge, and therefore more flexible multi-conductor cables and should eliminate any junction plug required for splitting common conductors into separate left-right circuits.

SUMMARY OF THE INVENTION

The present invention is directed to a uni-wire vehicle or trailer wiring harness system and method. Two separate sets of multi-conductor wiring bundles are drawn through an extruder which coats both bundles with a separate insulating cover to form separate multi-conductor cables with the two cables being attached together during the extrusion process by a common web to form a "uni-wire" cable pair. Each cable in the uni-wire pair can include four, five or more individual conductors which are color coded for standard lighting but each cable is side specific. In other words, each of the cables of the uni-wire pair includes a white common wire, a brown and/or black marker/tail light wire, a red stop light wire, and, optionally, a blue wire for accessories. One of the cables includes a green wire to supply the curbside turn signal and the other cable has a yellow wire to supply the roadside turn signal. The uni-wire cable pair, since there are no conductors common to left and right circuits, can use lighter gauge conductors than prior art cables, which makes the uni-wire pair more flexible and easier to work with. One end of each conductor in each cable of the uni-wire pair is attached to a respective terminal on the seven pin nose box receiver in the front of the truck or trailer. The uni-wire connecting web is severed near the rear of the truck or trailer so that the cables can be fed to opposing sides of the truck or trailer. The opposite end of each conductor in each cable of the uni-wire pair is then attached directly to the respective marker light, tail light, stop light, turn signal or accessory, thus avoiding the need for a junction plug to separate left-right circuits.

OBJECTS AND ADVANTAGES OF THE INVENTION

The principal objects of the present invention include: providing an improved uni-wire vehicle or trailer wiring harness system and method; providing such a system in which a pair of multi-conductor cables are extruded with a connecting web therebetween to form a uni-wire cable pair; providing such a system in which each cable in the uni-wire cable pair contains conductors for supplying electricity to just the left or right lighting circuits of a truck or trailer; providing such a system in which the uni-wire cable pair uses smaller gauge wires and is thus more flexible than prior art multi-conductor cables; providing such a system which eliminates a junction plug required by prior art wiring harness systems; and providing such a system and method which saves on labor installation costs over prior art wiring harness systems; and providing such a system and method which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 4 is a schematic diagram of the trailer wiring harness system and method of FIG. 3.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
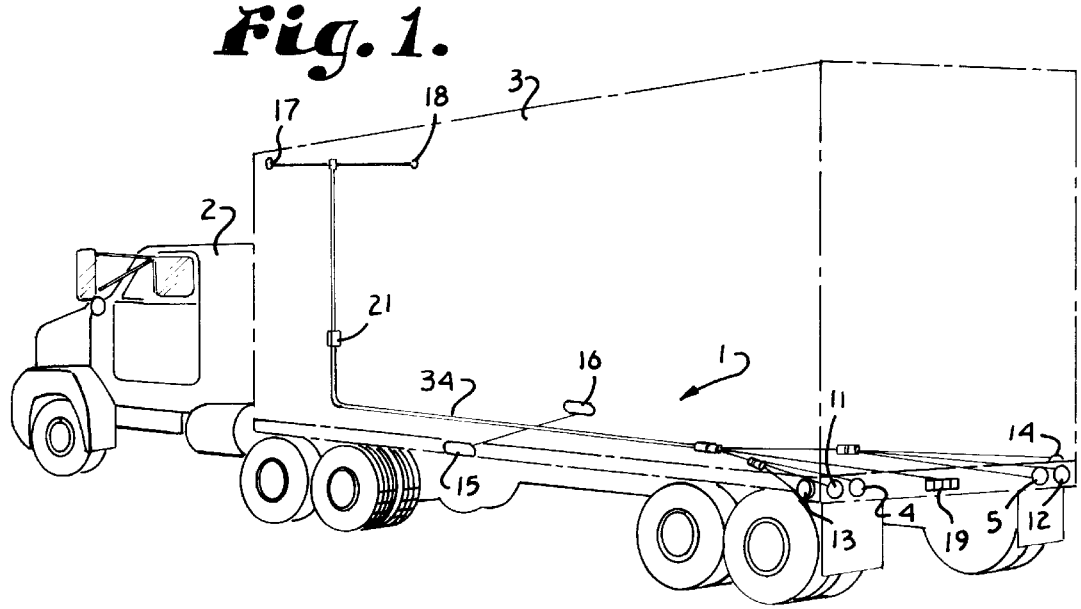
FIG. 1 is a perspective view of a semi-trailer and tractor with the upper portion of the trailer shown in phantom lines to reveal a prior art trailer wiring harness system.
Figure 2:
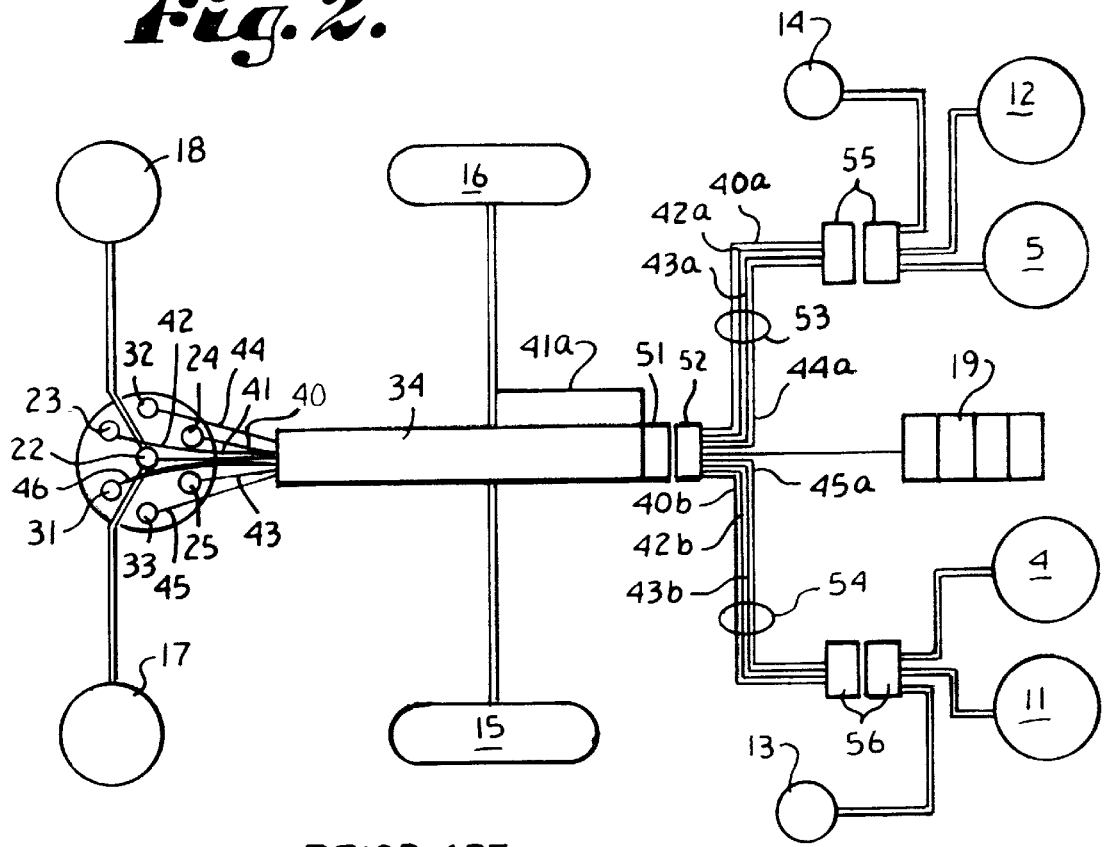
FIG. 2 is a schematic diagram of the prior art trailer wiring harness system of FIG. 1.

Referring to FIGS. 1 and 2, a prior art trailer wiring harness is illustrated and generally indicated at 1. FIG. 1 shows a semi-trailer tractor 2 and trailer 3 with a standard, minimal lighting configuration. The trailer 3 includes road side and curb side tail lights 4 and 5, respectively and road side and curb side turn signals 11 and 12, respectively, which turn signals 11 and 12 also serve as brake or stop lights. The trailer 3 also includes rear road and curb side marker lights 13 and 14, respectively, midtrailer road and curb side marker lights 15 and 16, respectively, and front road and curb side marker lights 17 and 18, respectively. An accessory connection 19 is positioned on the rear of the trailer 3.

At the front of the trailer 3, a common seven pin nose box 21 connects to lighting and accessory conductors (not shown) leading from the tractor 2. Referring to FIG. 2, specifically, the nose box 21 includes connections 22 and, optionally, 23, leading to conventional switches in the tractor 2 (not shown) for tail lights and marker lights, a connection 24 providing a common ground, a connection 25 leading to a brake light switch in the tractor 2 (not shown), a connection 31 optionally leading to an accessory control, such as an anti-lock braking system (not shown). The nose box 21 also includes a connection 32 and a connection 33 leading to tractor mounted curbside and road side turn signal switches, respectively (also not shown).

A conventional trailer wiring harness includes an elongate multi-conductor cable 34 which includes, for example, seven different individual insulated conductors including a white common ground conductor 40 and brown conductors 41 and 42 commonly feeding the road side and curb side tail lights 4 and 5, respectively, as well as midtrailer marker lights 13 and 14 and rear side marker lights 15 and 16. A red conductor 43 commonly feeds the road side and curb side stop/turn signal lights 11 and 12 to provide a brake or stop signal. A yellow conductor 44 exclusively feeds the road side turn/stop signal 11, and a green conductor 45 exclusively feed the curb side turn/stop signal 12. Finally, an additional blue conductor 46 can be included for feeding the accessory connection 19, for feeding an accessory, such as an anti-lock braking system (not shown).

As is more clearly illustrated in FIG. 2, in the prior art system of FIGS. 1 and 2, in order to split the common conductors between the curb side and the road side of the trailer near the rear of the trailer 3, a female receptacle 51 receives and provides an individual terminal for each of the conductors 40, 41, 42, 43, 44, 45 and 46. A mating male plug 52 has mating terminals for each of the conductors 40, 41, 42, 43, 44, 45 and 46. A curb side cable 53 and a road side cable 54, as well as an accessory conductor 46a split off of the male plug 52. The curb side cable 53 includes conductors 40a, 42a, and 43a, split off of the common conductors 40, 42, and 43, respectively, and the road side cable 54 includes conductors 40b, 42b, and 43b, also split off of each of the common conductors 40, 42, and 43 respectively. In addition, the curb side cable 53 includes a conductor 44a which extends the curb side turn signal conductor 44 to the curb side turn signal 12, and the road side cable 54 includes a conductor 45a which extends the road side turn signal conductor 45 to the road side turn signal 11. Finally, the accessory conductor 46a extends the accessory conductor 46 to the accessory connection 19 and connector 41a extends the conductor 41 to the mid-trailer marker lights 15 and 16. Standard lighting connector plug/receptacles 55 and 56 can be used to electrically connect the curb side lights 5, 12 and 14 and the road side lights 4, 11 and 13.

As mentioned earlier, the prior art use of the combination of the female receptacle 51 and male plug 52 to split out common conductors between curb side and road side systems in the trailer 3 presents a number of problems. The use of common conductors 41, 42, and 43 running the length of the trailer 3 requires that relatively heavy gauge conductors be used to minimize resistance, e.g. 12 gauge wire is required for the common conductors in a typical semi-trailer. Due to the relatively heavy gauge conductors needed, the multi-conductor cable 34 is fairly rigid and inflexible, as well as being expensive. The junction receptacle/plug 51–52 which is required for splitting the common conductors between curb and road side circuits is expensive, adds resistance and is subject to moisture penetration and accompanying corrosion.

Figure 3:
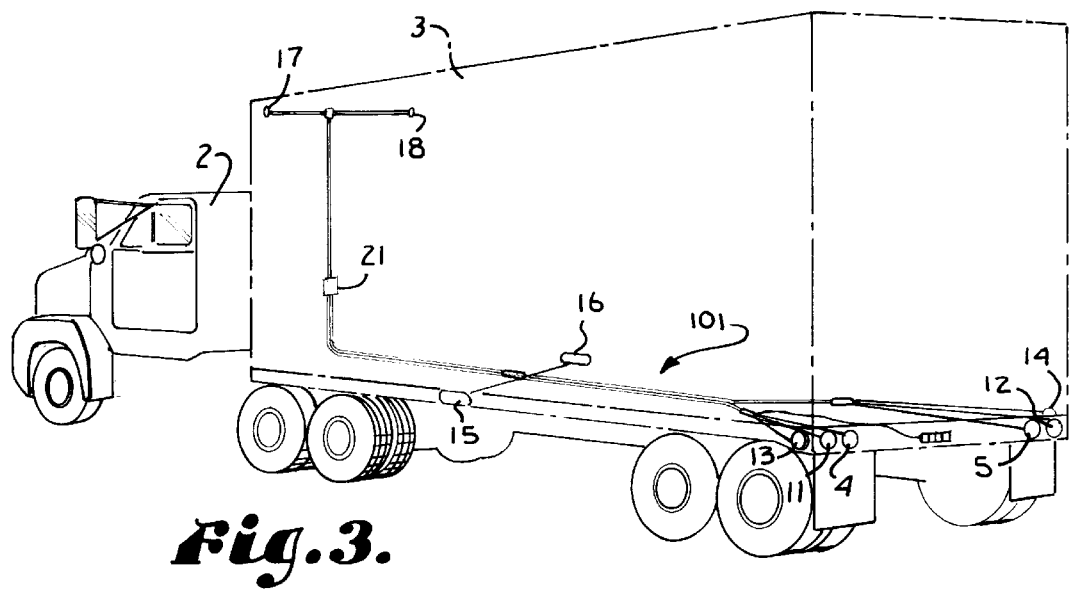
FIG. 3 is a perspective view of a semi-trailer and tractor with the upper portion of the trailer shown in phantom lines to reveal a trailer wiring harness system and method in accordance with the present invention.
Figure 5:
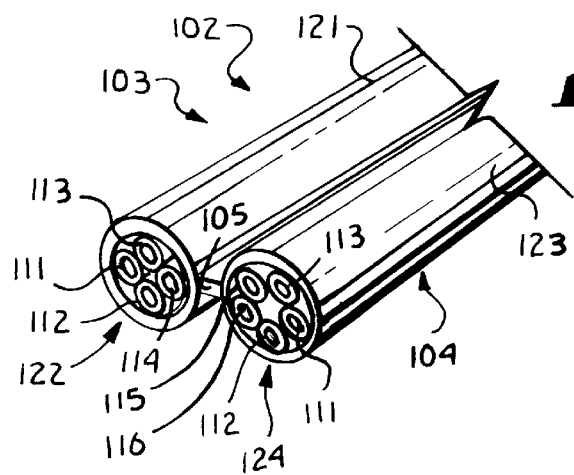
FIG. 5 is a greatly enlarged, fragmentary perspective view of a portion of the uni-wire wiring harness of FIG. 3, illustrating the double cable and intervening web construction thereof.

Referring to FIGS. 3–5, an inventive uni-wire trailer wiring harness is illustrated and generally indicated at 101. FIG. 3 shows the same semi-trailer tractor 2 and trailer 3 as described above, again with a standard, minimal lighting configuration, i.e. the same road side and curb side tail lights 4 and 5, respectively and road side and curb side turn signals 11 and 12, which turn signals 11 and 12 also serve as brake or stop lights, as well as mid-side marker lights 13 and 14, rear side marker lights 15 and 16, and front marker lights 17 and 18. An accessory connection 19 is positioned on the rear of the trailer 3. The same common seven pin nose box 21 connects to lighting and accessory conductors with the same terminal arrangement and reference numerals described above.

The uni-wire wiring harness 101 includes an elongate uni-wire paired cable 102 which comprises a pair of individual multi-conductor cables 103 and 104 which are attached to each other by a web 105. Each of the attached uni-wire cables 103 and 104 includes, for example, four different individual insulated conductors including a white common ground conductor 111 and a brown conductor 112 which individually and separately feed the road side and curb side tail lights 4 and 5, respectively, as well as mid-side marker lights 13 and 14 and rear side marker lights 15 and 16. Each of the cables 103 and 104 also includes a red conductor 113 which individually separately feeds the road side and curb side stop/turn signal lights 11 and 12, respectively, to provide a brake or stop signal. The cable 103 includes a yellow conductor 114 which exclusively feeds the road side turn/stop signal 11, and the cable 104 includes a green conductor 115 exclusively feeds the curb side turn/stop signal 12. Finally, an additional blue conductor 116 can be included in cable 103, as shown, (or a separate accessory conductor 116 can be included in both cables 103 and 104, if desired) for feeding the accessory connection 19, as described earlier.

Once the uni-wire cable 102 reaches the rear of the trailer 3, the connecting web 105 can be split for a certain distance to allow the cable 103 to be separated from the cable 104 and fed to their respective curb and road sides of the trailer 3. Standard lighting connector plug/receptacles 55 and 56 are again shown to electrically connect the curb side lights 5, 12 and 14 and the road side lights 4, 11 and 13, as in the prior art.

As is more clearly illustrated in FIG. 4, the inventive uni-wire system eliminates the need for a splitting plug such as the prior art receptacle/plug 51–52 since there is no need to split any common conductors. This eliminates the problems associated with such a receptacle/plug such as expense, installation labor and susceptibility to moisture penetration with its accompanying corrosion and shorting tendencies. Furthermore, the elimination of common conductors, such as those found in the prior art system of FIGS. 1 and 2, allows the use of smaller gauge conductors in each of the cable 103 and 104. This makes a much more flexible cable 102 which can be more easily fed around and through obstacles in and beneath the trailer 3.

The uni-wire cable 102 is produced by simultaneously extruding an insulation jacket 121 around a bundle of conductors 122, which forms cable 103, an insulation jacket 123 around a bundle of conductors 124 which becomes cable 104, and the interconnecting web 105.

While the uni-wire system 101 has been described as including a pair of attached cables 103, 104, a three or four interconnected cable system could be used instead. In a similar vein, the number of conductors in each interconnected uni-wire cable 103 and 104 is variable depending upon the requirements of a particular trailer or truck set-up. It is thus to be understood that while certain forms of the present invention have been illustrated and described herein, it is not to be limited to the specific forms or arrangement of parts described and shown.

I claim:

1. A uni-wire wiring system designed to supply electrical power from the front portion of a vehicle to lighting and accessories proximate the rear portion of the vehicle, said vehicle including curb side lighting and road side lighting, said system comprising:

(a) a pair of multi-conductor cables of a length which can extend substantially the length of the vehicle, one of said multi-conductor cables including conductors dedicated to said curb side lighting, all of the so dedicated conductors being coded to supply only curb side lights of the vehicle and the other of said multi-conductor cables including conductors dedicated to said road side lighting, all of the so dedicated conductors being coded to supply only road side lights of the vehicle.

2. A wiring system as in claim 1, and further comprising attachment means for attaching said pair of multiconductor cables to each other substantially along their length.

3. A wiring system as in claim 2, wherein each cable in said pair includes an insulation jacket and said attachment means comprises a web extending between said insulation jackets.

4. A wiring system as in claim 1, wherein each cable in said pair includes an insulation jacket and said insulation jackets are attached to each other substantially along their length via an interconnecting web.

5. A wiring system as in claim 4, wherein said coded conductors in one of said cables in said pair include at least the following conductors:

(a) a conductor dedicated for solely supplying power to curb side tail and marker lights;
    (b) a conductor dedicated for solely supplying power to a curb side brake light or lights; and
    (c) a conductor dedicated for solely supplying power to a curb side turn signal light or lights.

6. A wiring system as in claim 5, wherein said coded conductors in the other one of said cables in said pair include at least the following conductors:

(a) a conductor dedicated for solely supplying power to road side tail and marker lights;
    (b) a conductor dedicated for solely supplying power to a road side brake light or lights; and
    (c) a conductor dedicated for solely supplying power to a road side turn signal light or lights.

7. A wiring system as in claim 6, wherein said coded conductors in at least one of said cables in said pair also include a dedicated accessory conductor.

8. A uni-wire wiring system designed to supply electrical power from the front portion of a vehicle to lighting and accessories proximate the rear portion of the vehicle, said vehicle including curb side lighting and road side lighting, said system comprising:

(a) a pair of multi-conductor cables of a length which can extend substantially the length of the vehicle, one of said multi-conductor cables including conductors dedicated to said curb side lighting, all of the so dedicated conductors being coded to supply only curb side lights of the vehicle and the other of said multi-conductor cables including conductors dedicated to said road side lighting, all of the so dedicated conductors being coded to supply only road side lights of the vehicle;
    (b) a separate insulation jacket extending around each cable in said pair and an interconnecting web attached to each of said insulation jackets substantially along their length such that said cables are attached.

9. A wiring system as in claim 8, wherein said coded conductors in one of said cables in said pair include at least the following conductors:

(a) a conductor dedicated for solely supplying power to curb side tail and marker lights;
    (b) a conductor dedicated for solely supplying power to a curb side brake light or lights; and
    (c) a conductor dedicated for solely supplying power to a curb side turn signal light or lights.

10. A wiring system as in claim 9, wherein said coded conductors in the other one of said cables in said pair include at least the following conductors:

(a) a conductor dedicated for solely supplying power to road side tail and marker lights;
    (b) a conductor dedicated for solely supplying power to a road side brake light or lights; and
    (c) a conductor dedicated for solely supplying power to a road side turn signal light or lights.

11. A wiring system as in claim 10, wherein said coded conductors in at least one of said cables in said pair also include a dedicated accessory conductor.

12. A method of wiring a vehicle to supply electrical power from the front portion of a vehicle to lighting and accessories proximate the rear portion of the vehicle, the vehicle including curb side lighting and road side lighting, said method comprising the steps of:

(a) placing an insulation jacket around a first multi-conductor cable including conductors dedicated to said curb side lighting, all of the so dedicated conductors being coded to supply only curb side lights of the vehicle;
    (b) placing a separate insulation jacket around a second multi-conductor cable including conductors dedicated to said road side lighting, all of the so dedicated conductors being coded to supply only road side lights of the vehicle;

(c) attaching said insulation jackets together substantially along their length via an interconnecting web;

(d) extending said pair of multi-conductor cables along substantially the length of the vehicle from the front portion to the rear portion thereof;

(e) connecting the front end of each of said cables in said pair to respective curb and road side lighting sources and signal sources; and (f) connecting the rear end of each of said cables in said pair to respective curb and road side marker, tail and signal lights.

13. A method as in claim 12, wherein said first placing step includes placing said insulation jacket around at least the following conductors:

(a) a conductor dedicated for solely supplying power to curb side tail and marker lights;

(b) a conductor dedicated for solely supplying power to a curb side brake light or lights; and (c) a conductor dedicated for solely supplying power to a curb side turn signal light or lights.

14. A method as in claim 13, wherein said second placing step includes placing said separate insulation jacket around at least the following conductors:

(a) a conductor dedicated for solely supplying power to road side tail and marker lights;

(b) a conductor dedicated for solely supplying power to a road side brake light or lights; and (c) a conductor dedicated for solely supplying power to a road side turn signal light or lights.

* * * * *